United States Patent [19]
Amundsen

[11] Patent Number: 4,566,433
[45] Date of Patent: Jan. 28, 1986

[54] SOLAR COLLECTOR

[76] Inventor: Robert F. Amundsen, 4051 NE. 13th Ave., Fort Lauderdale, Fla. 33334

[21] Appl. No.: 639,181

[22] Filed: Aug. 9, 1984

[51] Int. Cl.[4] .............................................. F24J 2/18
[52] U.S. Cl. ..................................... 126/439; 126/440
[58] Field of Search ............... 126/440, 443, 900, 438, 126/439

[56] References Cited

U.S. PATENT DOCUMENTS

| 3,991,741 | 11/1976 | Northrup | 126/440 |
| 4,156,420 | 5/1979 | Gunderson | 126/443 |
| 4,227,514 | 10/1980 | Spitzer | 126/445 |
| 4,238,246 | 12/1980 | Genequand | 126/440 |
| 4,376,372 | 3/1983 | English | 126/440 |

Primary Examiner—Carroll B. Dority, Jr.
Attorney, Agent, or Firm—Joseph Zallen

[57] ABSTRACT

A solar collector in which an elongated focusing means transmits the sun's rays to a dark, heat-absorbent fluid within a conduit surrounded by an evacuated chamber having a reflector.

6 Claims, 5 Drawing Figures

SOLAR COLLECTOR

BACKGROUND OF INVENTION

This invention relates to solar collectors and in particular to solar collectors having a higher efficiency than those previously described.

There is extensive prior art on solar collectors. The prior art most pertinent to the present invention is found in Class 126, Sub-classes 440, 443 and 900. Representative examples of this prior art comprise the following U.S. Pat. Nos. 4,069,810; 4,186,725; 4,188,941; 4,287,882; 4,307,710; 4,311,131; 4,287,882; 4,299,201; and 4,413,616; and the publication "Performance of a Black Liquid Solar Collector" by Minardi and Chuang of the Department of Mechanical Engineering, University of Dayton, Dayton, Ohio, in the book entitled "Solar Energy" Volume 17, Pages 179 to 183 published in 1975 by Pergamon Press.

There are many functional, mechanical and economic difficulties with the prior art. What appear to be appropriate in a theoretical sense turn out to be impractical commercially.

One object of the present invention is to provide a novel solar collector which is relatively inexpensive and commercially feasible. Other objects and advantages of this invention will be apparent from the description and claims which follow, taken together with the appended drawings.

SUMMARY OF INVENTION

The invention comprises generally the combination of a transparent conduit, a dark, heat-absorbent fluid spaced within the conduit, an evacuated transparent chamber surrounding the conduit, a reflective coating on one side of the chamber and elongated focusing means aligned with the conduit. The focusing means, which can be a solid lens or a lens including liquid, is arranged to focus the sun's rays that it receives within the fluid and also on the reflective coating which in turn focuses the rays into the fluid. Lenses that can be used include double convex lenses and Fresnel lenses, as well as liquid filled lenses of similar construction. The fluid is preferably a liquid having a high boiling point as for example, kerosene. The dark color of the fluid can be obtained by either dissolving or suspending colored material in the fluid, as for example, a suspension of finely divided carbon.

SPECIFIC EXAMPLE OF THE INVENTION

Figure 1:
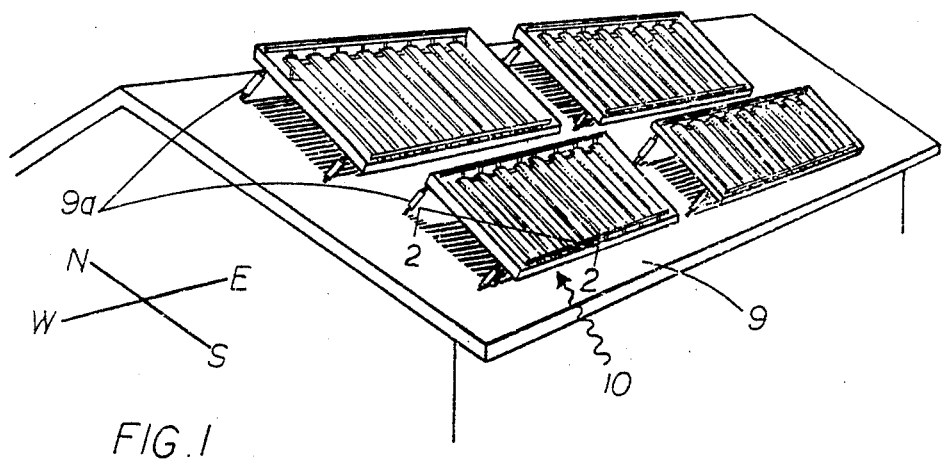
FIG. 1 is a perspective and diagrammatic form of application of the present invention to the rooftop of a building.
Figure 2:
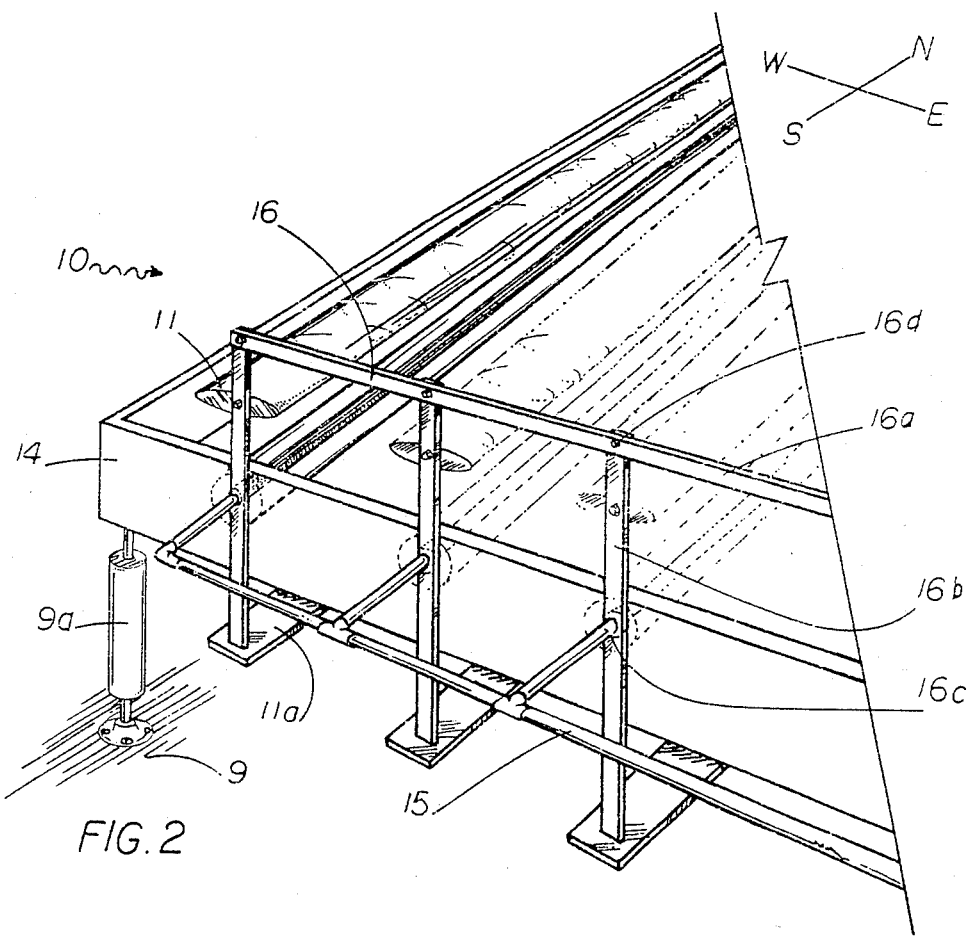
FIG. 2 is a partial, enlarged view of a portion of FIG. 1 along line 2—2.
Figure 3:
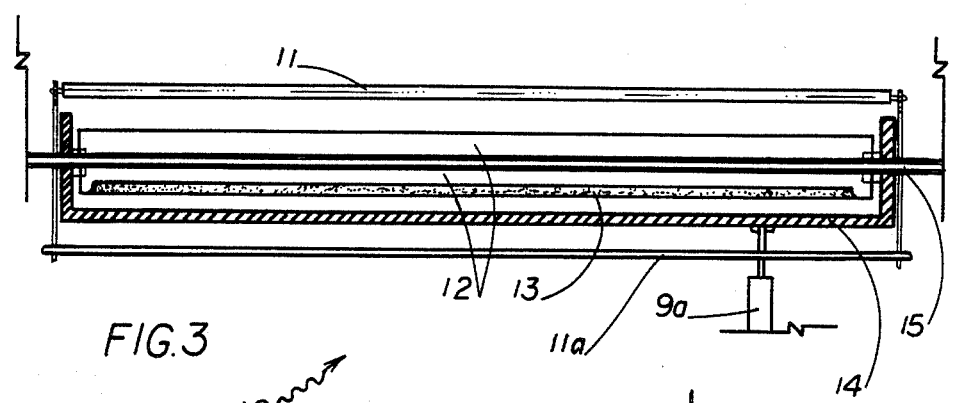
FIG. 3 is a longitudinal section.
Figure 4:
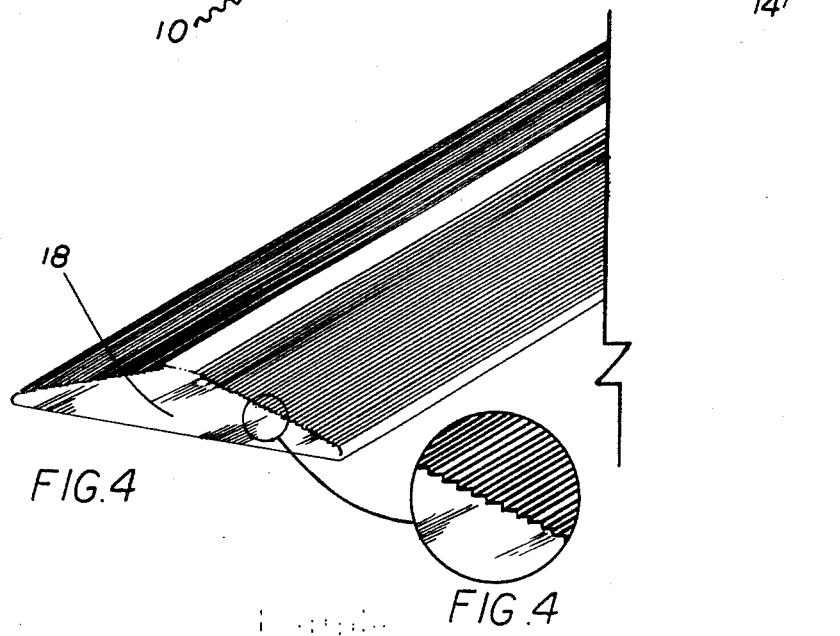
FIG. 4 shows a modification of part of this invention.
Figure 5:
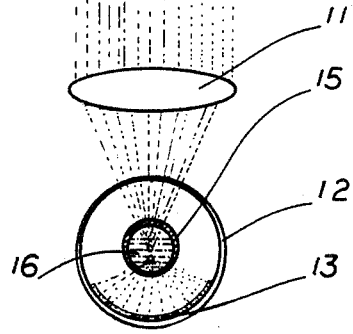
FIG. 5 is a diagrammatic view of the operation of this invention.

Referring now to the drawings, there is illustrated therein a roof 9 of a building. Mounted on the roof are a plurality of units 10 made in accordance with this invention. Each unit 10 includes a support 14 supported by movable pistons 9a. On the support 14 is a movable frame 16 holding a plurality of solar arrays 10b, each array comprising an upper elongated lens 11 and an evacuated transparent tube 12. Extending through tube 12 is a transparent fluid conduit 15 containing as its fluid finally divided carbon dispersed in kerosene. The fluid conduits 15 interconnect to form a network and can be opaque where they do not pass through the evacuated tubes. The network can include storage means, pumps, heat exchangers and similar equipment for utilizing the heated fluid.

On the back surface of the evacuated tube 12 and facing the lens 11 is a reflector surface 13. Frame 16 comprises vertical member 16b, horizontal member 16a attached at 16d, transverse bottom member 11a and means pivotally supporting the lenses 11. The conduit network 15 extends through orifices 16c in vertical members to support the tubes 12.

The sun's rays are focused by the double convex lens 11 or Fresnel lens 18 so as to concentrate in one portion of the fluid 16 while permitting the reflected portion from reflected surface 13 to concentrate on another portion of the fluid.

The motion of frame 16 can adjust the position of the focusing lenses 11 in an arc as the sun's position changes. There are various prior art devices and methods for tracking the sun which can be used in the practice of this invention.

I claim:

1. A solar collector comprising in combination a transparent conduit, a dark, heat-absorbant fluid within said conduit, an evacuated transparent chamber surrounding said conduit, reflective means on one side of said evacuated chamber, and elongated focusing means aligned with said conduit; said collector being characterized in that said focusing means will focus the sun's rays that it receives into an upper focusing line in said fluid, the rays then passing through to said reflective means which focus said rays back into a second lower focusing line in said fluid.

2. The solar collector of claim 1 wherein said focusing means is a double convex lens.

3. The solar collector of claim 1 wherein said focusing means is a Fresnel lens.

4. The solar collector of claim 1 wherein said fluid is a liquid having a high boiling point.

5. The solar collector of claim 1 wherein said fluid comprises finely divided carbon in kerosene.

6. The solar collector of claim 1 wherein means are provided for moving said focusing means in an arc around said conduit.

* * * * *